(No Model.)
I. SAMUELS.
TOY FISHING APPARATUS.
No. 464,391. Patented Dec. 1, 1891.
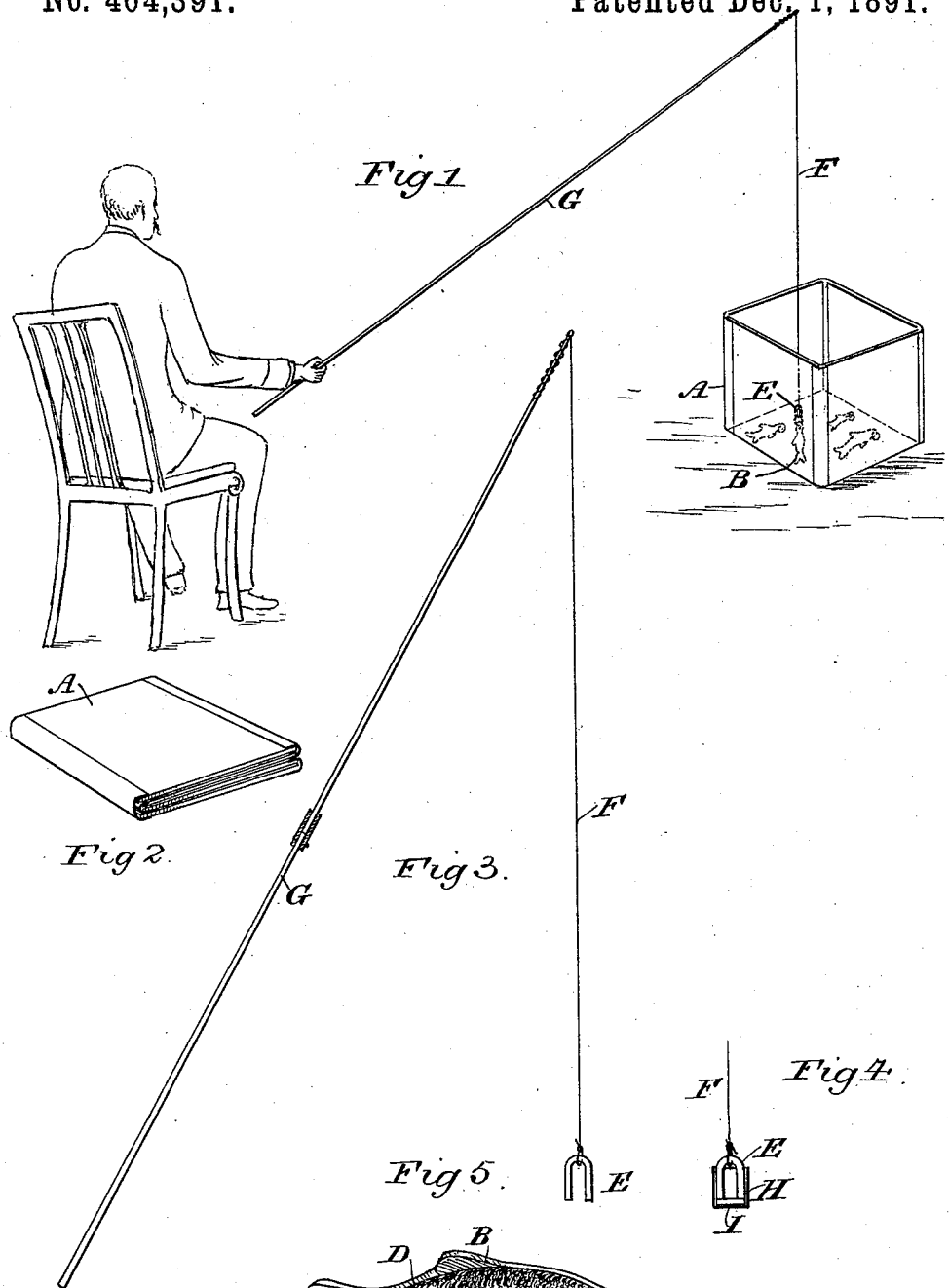
WITNESSES:
Paul Johst
C. Sedgwick
INVENTOR:
I. Samuels
BY Munn & Co.
ATTORNEYS

UNITED STATES PATENT OFFICE.

IZAK SAMUELS, OF NEW YORK, N. Y.

TOY FISHING APPARATUS.

SPECIFICATION forming part of Letters Patent No. 464,391, dated December 1, 1891.

Application filed April 23, 1891. Serial No. 390,132. (No model.)

*To all whom it may concern:*

Be it known that I, IZAK SAMUELS, of the city, county, and State of New York, have invented a new and Improved Toy Fishing Apparatus, of which the following is a full, clear, and exact description.

The object of the invention is to provide a new and improved toy fishing apparatus which is simple and durable in construction, affords great amusement, and is adapted to be played by a single person or as a game by two or more persons.

The invention consists of a box representing a pond, imitation water-animals representing fishes, crabs, and the like, and made of suitable material, each imitation animal being provided with a piece of soft iron, and a fishing-tackle supporting on its line a magnet instead of a hook, said magnet being adapted to engage the piece of soft iron carried by the imitation animals.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a perspective view of the improvement in use. Fig. 2 is a perspective view of the box as folded up. Fig. 3 is a side elevation of the fishing-tackle. Fig. 4 is a sectional side elevation of the casing for the magnet, and Fig. 5 is an enlarged side elevation of one of the imitation animals.

The improved toy fishing apparatus is provided with a box A, adapted to represent a fish-pond, and formed without a bottom or top. The sides of the box A are adapted to fold one upon the other, so that the box when folded can be readily carried about or conveniently stored away. (See Fig. 2.)

When the box A is open in the position shown in Fig. 1, it can be readily set on a table, floor, or the like, so that the same forms the bottom of the box. In this box when set up are placed a number of imitation animals B, representing fishes, crabs, and the like, the said imitation figures being formed of cardboard or other suitable material which is non-magnetic.

In the mouth or head of each imitation animal is held loosely a ring C, made of soft iron, which readily demagnetizes. Each of the imitation animals is also provided with a numeral D or other character for identifying it. The ring C is adapted to be engaged by or attracted upon a magnet E, preferably of U shape, as plainly shown in Figs. 3 and 4, the said magnet being secured in place of the usual hook on the end of the line F, held on a pole G of a suitable fishing-tackle.

When the apparatus is not in use, the magnet E of the fishing-tackle is placed or fitted into a casing H, made of paper or other like material and containing in its bottom an armature I, adapted to pass upon the poles of the magnet, so as to prevent the latter from losing its magnetic force. When the box A has been set up and the imitation animals B have been thrown profusely therein, then the person or persons seat themselves some distance from the box, so that the imitation animals cannot be seen by the person now using the fishing-tackle, with the line F and magnet E passed into the box for the magnet to attract one of the rings whenever the said magnet is passed in contact or close to one of the rings C of the respective imitation animal. The person playing readily detects that the imitation animal is suspended on the line, and on raising the rod G the respective imitation animal is lifted out of the box, being suspended on the end of the magnet. The number or other character D indicates the value of the prize caught.

It will be seen that a game of this kind affords very great amusement to the parties playing it, principally because they are totally unable to see the imitation animals, and cannot therefore predetermine the value of the prize caught.

I am aware that toy fishing apparatus have been constructed in which the imitation animals were each provided with a magnet or magnets adapted to be attracted by a hook or other device on the line of the fishing-tackle. In this apparatus the magnets of the several animals were attracted one to the other, so that the animals always were arranged in bunches, and two or more were attracted at the same time to the hook on the line. Furthermore this apparatus was quite expensive, as it required a large number of magnets, while with my apparatus only a single magnet is necessary.

Having thus fully described my invention, I claim as new and desire to secure by Letters Patent—

1. A toy fishing apparatus comprising an imitation water-animal having a soft-iron ring passing loosely through an aperture therein and a rod provided with a line having a horseshoe-magnet attached thereto, whereby when the magnet attracts the ring the animal will hang in a natural manner, substantially as set forth.

2. A toy fishing apparatus comprising a folding box without top or bottom and adapted to be set upon a table, floor, &c., a series of imitation water-animals held within the said box on the table, floor, &c., supporting the box, a soft-iron ring for each of the said imitation animals, a fishing-tackle supporting the end of the line, and a horseshoe-magnet on the line adapted to attract one of the said soft-iron rings to suspend the imitation fish on the line, substantially as shown and described.

3. In a toy fishing apparatus, the combination, with a fishing-tackle supporting on its line a horseshoe-magnet, of a casing adapted to fit upon the said magnet and an armature secured in the said casing and adapted to be engaged by the poles of the said magnet, substantially as shown and described.

IZAK SAMUELS.

Witnesses:
THEO. G. HOSTER,
C. SEDGWICK.